(12) United States Patent
Kido et al.

(10) Patent No.: US 6,909,766 B2
(45) Date of Patent: Jun. 21, 2005

(54) PRODUCTION METHOD FOR A NUCLEAR FUEL ASSEMBLY SUPPORT GRID AND A NUCLEAR FUEL ASSEMBLY SUPPORT GRID PRODUCED BY THE SAME

(75) Inventors: Toshiya Kido, Naka-gun (JP); Kimio Nakayama, Naka-gun (JP); Yasunao Yamaguchi, Kobe (JP)

(73) Assignees: Mitsubishi Nuclear Fuel Co., Ltd., Naka-gun (JP); Mitsubishi Heavy Industries, Ltd., Tokyo (JP); Nuclear Development Corporation, Naka-gun (JP)

( * ) Notice: Subject to any disclaimer, the term of this patent is extended or adjusted under 35 U.S.C. 154(b) by 54 days.

(21) Appl. No.: 10/287,505

(22) Filed: Nov. 5, 2002

(65) Prior Publication Data

US 2004/0076256 A1 Apr. 22, 2004

(30) Foreign Application Priority Data

Nov. 8, 2001 (JP) ........................................ 2001-343735

(51) Int. Cl.$^7$ ................................................. G21C 3/34
(52) U.S. Cl. .................... 376/438; 376/409; 376/439; 376/443; 376/434; 376/454; 376/462; 148/401; 148/421; 148/516; 148/668; 148/672
(58) Field of Search ................................. 376/409, 438, 376/439, 443, 434, 454, 462, 261, 446; 148/401, 421, 516, 668, 672, 405, 622, 693, 694, 648; 219/136, 146.1, 146.32; 266/101, 249

(56) References Cited

U.S. PATENT DOCUMENTS

| | | | | |
|---|---|---|---|---|
| 4,003,788 A | * | 1/1977 | Boyko et al. | ................. 376/451 |
| 4,664,727 A | * | 5/1987 | Inagaki et al. | ............... 148/407 |
| 4,842,814 A | * | 6/1989 | Takase et al. | ................ 376/438 |
| 4,918,710 A | * | 4/1990 | Bard | ............................ 148/527 |
| 4,938,921 A | | 7/1990 | Mardon et al. | .............. 376/457 |
| 5,019,333 A | * | 5/1991 | Isobe et al. | .................. 420/422 |
| 5,024,426 A | * | 6/1991 | Busch et al. | ................. 267/158 |
| 5,183,629 A | * | 2/1993 | Canat et al. | ................. 376/439 |
| 5,211,908 A | | 5/1993 | Verdier | ........................ 376/442 |

(Continued)

FOREIGN PATENT DOCUMENTS

| | | | |
|---|---|---|---|
| CN | 1030261 A | | 1/1989 |
| CN | 1032258 A | | 4/1989 |
| CN | 218931 | * | 1/1994 |
| CN | 233363 | * | 11/1994 |
| JP | J6 2091892 | * | 4/1987 |
| JP | 6-281772 | * | 10/1994 |
| JP | 406281772 | * | 10/1994 |
| JP | 8-129096 | * | 5/1996 |
| JP | 8-271667 | * | 10/1996 |
| WO | WO 095001639 | * | 1/1995 |

OTHER PUBLICATIONS

S.G. McDonald, et al., "Mechanism of Accelerated Corrosion in Zircaloy–4 Laser and Electron–Beam Welds", ASTM STP 754, 1982, pp. 412–429.

*Primary Examiner*—Michael J.E Carone
*Assistant Examiner*—John Richardson
(74) *Attorney, Agent, or Firm*—Oblon, Spivak, McClelland, Maier & Neustadt, P.C.

(57) ABSTRACT

One object of the present invention is to provide a production method for a nuclear fuel assembly support grid that improves the corrosion resistance of welded parts without impairing the characteristics of the support grid so as to be able adequately withstand highly efficient operation. In order to achieve the object, the present invention provide a production method for a nuclear fuel assembly support grid comprising the steps of: assembling a plurality of straps in a grid form; welding intersections of each strap; and carrying out annealing thereafter to precipitate an intermetallic compound on the welded parts.

6 Claims, 4 Drawing Sheets

U.S. PATENT DOCUMENTS

| | | | |
|---|---|---|---|
| 5,297,177 A | * 3/1994 | Inagaki et al. | 376/462 |
| 5,305,359 A | * 4/1994 | Adamson et al. | 376/260 |
| 5,361,282 A | 11/1994 | Adamson et al. | 376/443 |
| 5,577,081 A | * 11/1996 | Yaginuma | 376/260 |
| 5,596,615 A | * 1/1997 | Nakamura et al. | 376/438 |
| 5,670,072 A | * 9/1997 | Offer et al. | 219/137 R |
| 5,835,550 A | * 11/1998 | Van Swam et al. | 376/409 |
| 5,854,818 A | * 12/1998 | Van Swam et al. | 376/409 |

* cited by examiner

RESULTS OF GRID CORROSION TEST (360°C)

PRODUCTION METHOD FOR A NUCLEAR FUEL ASSEMBLY SUPPORT GRID AND A NUCLEAR FUEL ASSEMBLY SUPPORT GRID PRODUCED BY THE SAME

BACKGROUND OF THE INVENTION

1. Field of the Invention

The present invention relates to a production method for a support grid of a nuclear fuel assembly used in, for example, a pressurized water reactor, and a nuclear fuel assembly support grid produced by the production method.

2. Description of the Related Art

In the past, the fuel assemblies used in the nuclear reactor of a light water reactor comprised of arranging a plurality of support grids at prescribed intervals between an upper nozzle and lower nozzle, respectively mounting an instrumentation tube and a plurality of control rod guide tubes on each support grid, upper nozzle and lower nozzle, and holding the fuel rods by inserting them into the grid space of each support grid. Each support grid is composed by crossing thin, band-shaped straps in the form of a grid.

The straps are formed from, for example, zircaloy 2 alloy or zircaloy 4 alloy, and as shown in FIGS. 2A and 2B, each inner strap 2 is assembled in the form of a grid, and the intersections at which each inner strap 2 crosses in a state in which a large number of grid spaces 3 are formed are respectively spot welded in the form of weld P with a laser welding apparatus and so forth. In addition, at the intersections of inner straps 2 and outer straps 4, engaging parts (intersections) are composed by respectively engaging welding tabs 5 formed on both ends of each inner strap 2 with slots 4a of outer straps 4 located on the four sides of support grid 1, and these are then welded in the form of weld R (the state prior to welding is shown in FIG. 2B).

When assembling support grid 1, a material plate made of zircaloy alloy is first punched to a prescribed shape, as shown in the flow chart of FIG. 3. At this time, since concern remains over dimensional stability within the nuclear reactor if support grid 1 is assembled in its original state following punching, each strap 2 and 4 is annealed inside a heat treatment furnace by employing stress relief annealing under conditions that do not reduce strength. Stress relief annealing conditions in this case are, for example, a heating temperature of about 430–500° C. and holding time of about 0.5–4 hours.

Each strap 2 and 4 is then assembled into the form of a grid following stress relief annealing, and welding is performed centering on intersections (including engaging parts) P and R of each strap 2 and 4 to produce a support grid.

However, in this type of support grid, a metal structure welded parts P and R are left welded centering on the intersections of each strap 2 and 4 (welded structure) remains as is in the form of a rapidly cooled structure following welding, and when used by arranging fuel assemblies in high-temperature water inside a nuclear reactor in particular, there is excessive growth of an oxide film on the rapidly cooled structures of welded parts P and R as compared with the ordinary base material serving as the strap parts other than welded parts P and R of each support grid 1.

For example, in the support grid corrosion test shown in FIG. 4, when the changes over time in oxide film thickness were measured for ordinary base material parts and welded parts of the above support grid at a high temperature of 360° C., as shown in the drawing, as the number of days the corrosion test was conducted increased, the oxide films of the ordinary base metal parts and welded parts successively increased. Moreover, the thicknesses of the oxide film according to changes over time of the welded parts exceeded those of the general base material parts in all cases, and the corrosion resistance of the welded parts was lower than that of the ordinary base material parts. As is described in the literature (S. G. MacDonald et al., ASTM STP 754 (1982) 412), the cause of this can be considered to be a loss of added elements of the welded parts due to welding.

Although the corrosion resistance characteristics of the welded parts of such a support grid is well within the allowed range in an ordinary nuclear reactor and do not cause any particular problems, when a nuclear reactor using a high burn-up fuel, such as fuel pellets in which the concentration of $U_{238}$ within the uranium dioxide is increased to nearly 5%, is operated for a long period of time at high burn-up (high efficiency), although the corrosion resistance of the welded parts may not deviate outside the allowed range, the amount of leeway with respect to the allowed range decreases. In addition, the excessive formation of an oxide film is also not desirable from the standpoint of structural strength of the support grid.

SUMMARY OF THE INVENTION

In consideration of the above problems, the object of the present invention is to provide a production method for a fuel assembly support grid that improves the corrosion resistance of welded parts without impairing the characteristics of the support grid, and a fuel assembly support grid which is produced by the production method and which has excellent characteristics.

The production method for a fuel assembly support grid according to the present invention is the result of finding that the relative decrease in corrosion resistance of welded parts is not due to the loss of added elements of the welded parts caused by welding as previously indicated, but rather caused by a rapidly cooled structure formed after welding.

Namely, the present invention provides a production method for a fuel assembly support grid comprising the steps of: assembling a plurality of straps in a grid form; welding intersections of each strap; and carrying out annealing thereafter to precipitate an intermetallic compound on the welded parts.

According to the production method of the present invention, even if the corrosion resistance of the rapidly cooled structure of the welded parts following welding decreases, by carrying out annealing thereafter, the rapidly cooled structure of the welded parts is adjusted and an intermetallic compound is precipitated thereby resulting in improved corrosion resistance. As a result, even if highly efficient operation is performed using a high burn-up fuel, it is possible to ensure an improved range of corrosion resistance, and adequate corrosion resistance can be ensured over the course of long-term operation.

In addition, when the support grid is assembled and the intersections of each strap are welded, although corrosion resistance decreases due to the crystals of the rapidly cooled structure of the welded parts being transformed due to subsequent rapid cooling by the welded parts, the rapidly cooled structure of the welded parts in which the crystals have transformed can be adjusted so that corrosion resistance improves by annealing the support grid in a subsequent step.

In the production method for a fuel assembly support grid, it is preferable for the straps to be made of zircaloy alloy.

In the production method for a fuel assembly support grid, it is more preferable for the zircaloy alloy to comprise tin in an amount of 1.2 to 1.7% by weight, iron in an amount of 0.18 to 0.24% by weight, chromium in an amount of 0.07 to 0.13% by weight, oxygen in an amount of 0.09 to 0.16% by weight, and balance being zirconium and unavoidable impurities. As described, the zircaloy alloy used in the present invention may comprise a small amount of unavoidable impurities.

In particular, when the straps are made of zircaloy alloy, although the $\beta$ phase, which is a high-temperature metal phase, is transformed into crystals of a quenched structure due to rapid cooling after welding causing a decrease in corrosion resistance, the metal structure of the prior-$\beta$ phase, which is the rapidly cooled structure of the welded parts, can be adjusted by subsequent annealing to precipitate an intermetallic compound and improve the corrosion resistance of the welded parts.

In the production method for a fuel assembly support grid, annealing is preferably recrystallization annealing for transforming the welded parts into a recrystallized structure.

As a result of carrying out recrystallization annealing, the strain of the rapidly cooled structure of the welded parts is adjusted and eliminated causing it to be transformed into a recrystallized structure, and corrosion resistance is improved by precipitating an intermetallic compound.

Furthermore, in the present invention, the stress relief annealing of the prior art for removing strain caused by punching of the material plate is not carried out. Even if the strength of the straps is increased by performing stress relief annealing to remove strain caused by punching, since the strength decreases due to the structure of the parts containing punching strain again being transformed as a result of carrying out subsequent recrystallization annealing, this ends up being wasteful.

In addition, annealing is preferably carried out by setting the annealing temperature to 560–750° C. and holding for 0.5–24 hours.

Furthermore, annealing is more preferably carried out at 660–700° C.

As a result of holding for the prescribed time at a heating temperature within this range, in addition to corrosion resistance improving as a result of precipitating an intermetallic compound following adjustment of the rapidly cooled structure of the welded parts, strain and internal stress caused by welding and punching can be eliminated.

In particular, an annealing temperature range of 560–730° C. is a condition for recrystallization that does not cause a decrease in corrosion resistance, while if the annealing temperature exceeds 750° C., there is the disadvantage of this potentially leading to a decrease in corrosion resistance. In addition, if the holding time of the annealing temperature is shorter than 0.5 hours, it is no longer possible to adjust the rapidly cooled structure of the welded parts and precipitate an intermetallic compound, while a holding time in excess of 24 hours causes the problem of potentially inviting a decrease in corrosion resistance.

In addition, in the production method for a fuel assembly support grid, when a filler metal is used for welding, it is preferable for the filler metal to comprise tin in an amount of 1.2 to 1.7% by weight, iron in an amount of 0.18 to 0.24% by weight, chromium in an amount of 0.07 to 0.13% by weight, oxygen in an amount of 0.09 to 0.16% by weight, and balance being zirconium and unavoidable impurities.

According to the production method for a fuel assembly support grid, since a filler metal comprising a such composition is used for welding, it is possible to prevent a decrease in volume of the intersections, which is caused by melting and flowing of the material comprising the intersections during welding. In addition, since the filler metal comprises a such composition, it is possible to produce the support grid having an excellent structural strength.

Furthermore, in the production method for a fuel assembly support grid, it is preferable for the intermetallic compound to be represented by Zr (Fe, Cr)$_2$.

In addition, in order to achieve the object, the present invention provides a fuel assembly support grid obtainable by the production method for a fuel assembly support grid.

DETAILED DESCRIPTION OF THE PREFERRED EMBODIMENTS

Figure 1:
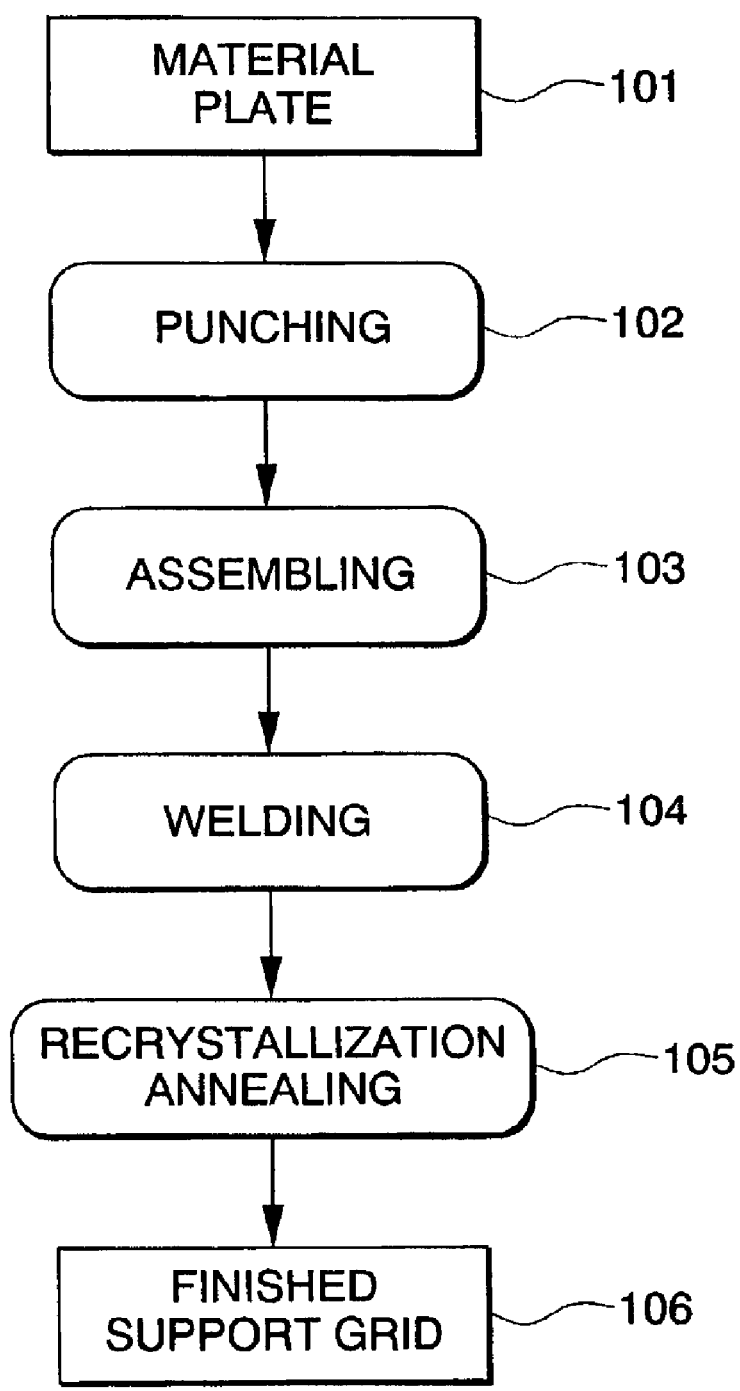
FIG. 1 is a flow chart showing the production steps for a fuel assembly support grid of an embodiment according to the present invention.
Figure 2A:
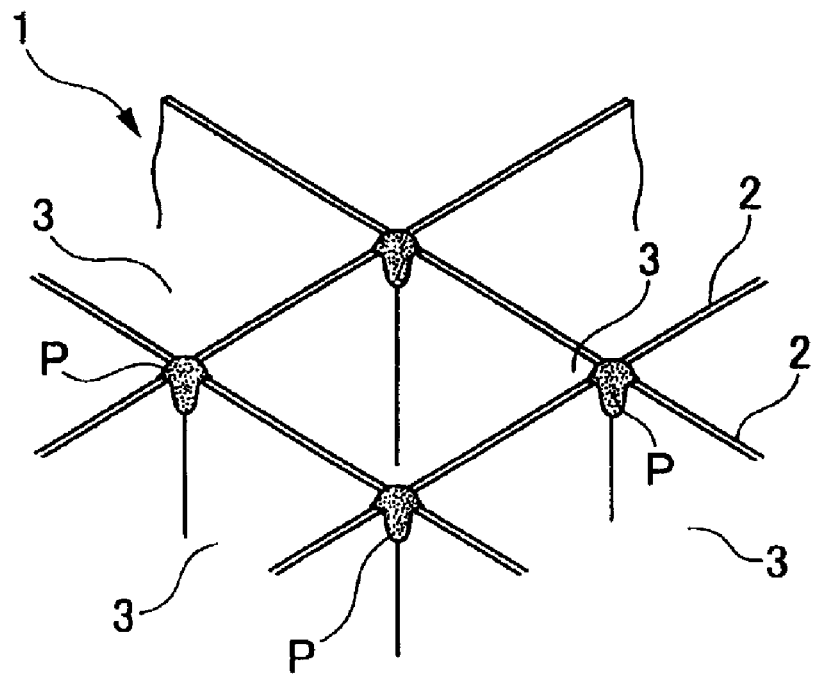
FIG. 2 is a partial perspective view of a typical support grid, with FIG. 2A being a drawing showing the intersections of inner straps, and FIG. 2B being a drawing showing the intersection parts of inner straps and outer straps.
Figure 2B:
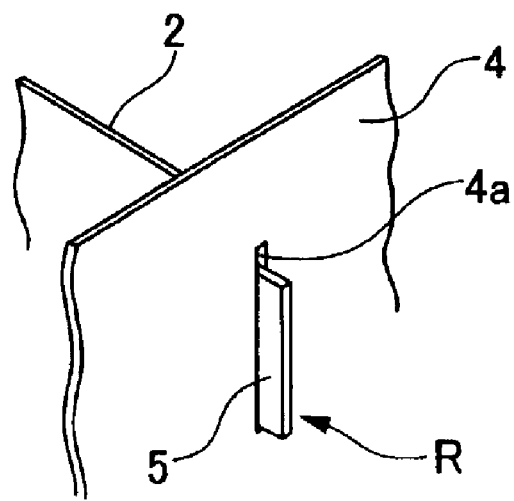
Figure 3:
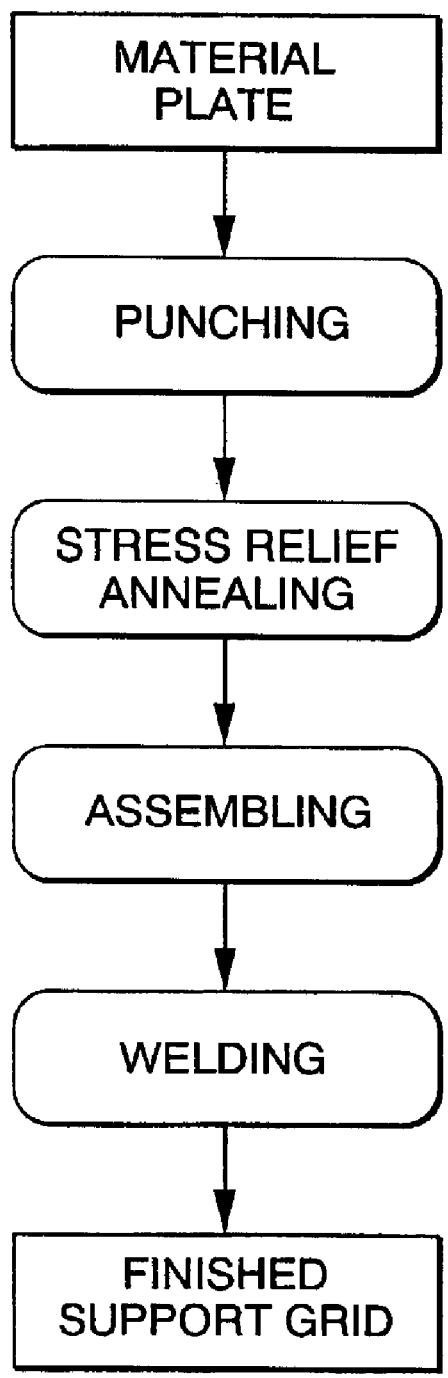
FIG. 3 is a flow chart showing the production steps of a support grid of the prior art.

FIG. 1 is a flow chart showing the production steps for a fuel assembly support grid of an embodiment according to the present invention.

The support grid produced by an embodiment of the present invention is similar to that of the prior art in that it is formed by combining thin band-shaped straps in the form of a grid. The straps comprises inner straps and outer straps, and these straps are made of, for example, a zircaloy alloy such as zircaloy 2 or zircaloy 4. The support grid is integrally assembled by respectively welding and connecting the intersections of corresponding inner straps, the intersections of inner straps and outer straps, and the intersections of corresponding outer straps.

The following provides an explanation of the production method for a fuel support grid of this embodiment by following a flow chart shown in FIG. 1.

To begin with, a zircaloy alloy such as zircaloy 2 or zircaloy 4 is prepared for use as the material plate (Step 101), and this is punched to the desired strap shape (Step 102). As a result of this punching, the straps undergo plastic deformation and so forth centering on the punched parts and take on a processed structure.

Next, a plurality of inner straps and outer straps are assembled into the shape of a grid to form a support grid (Step 103). The intersections of corresponding inner straps, the intersections of inner straps and outer straps (including engaging parts), and the intersections of corresponding outer straps are respectively welded (Step 104). As a result of welding, although the structure of the welded parts of the zircaloy alloy undergoes a change in which it is transformed from a low-temperature stable phase in the form of an $\alpha$ phase having spherical crystal grains to a high-temperature stable phase in the form of $\beta$ phase, since the welded parts are rapidly cooled at, for example, about 100° C./second following welding, the rapidly cooled structure of the welded parts is transformed into a quenched structure of the β phase resulting in a prior-β phase (or quenched α phase), thereby causing a decrease in corrosion resistance due to transformation of the crystals into needle-shaped crystal grains.

Figure 4:
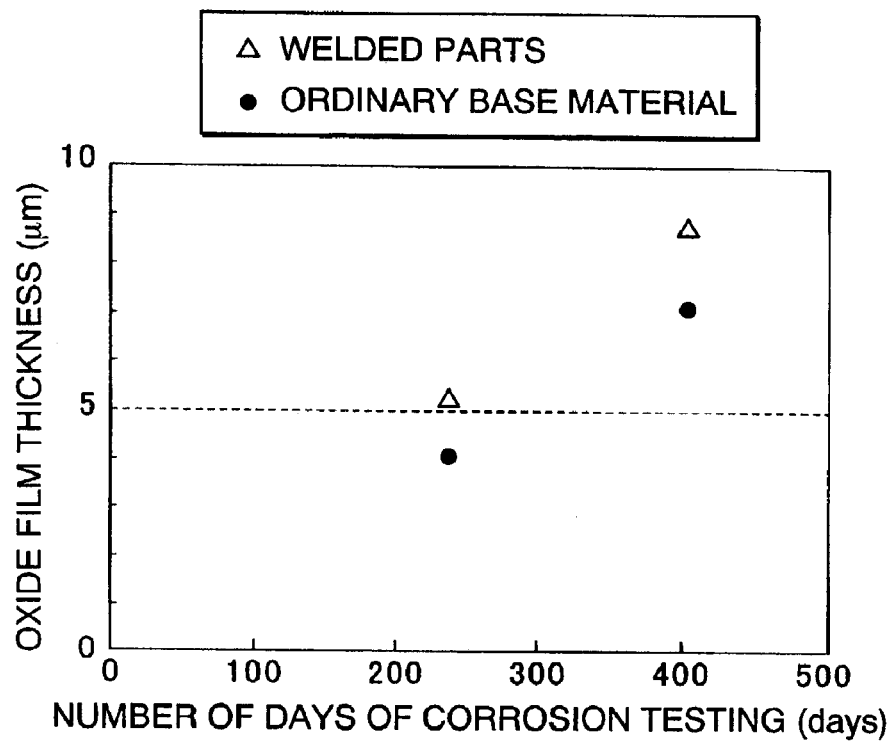
FIG. 4 is a drawing showing the relationship between the number of days of corrosion testing and oxide film thickness for an ordinary base material and welded parts of a strap.

Furthermore, if the rapidly cooled structure of the welded parts is used in a nuclear reactor in the same state as that after welding (welded structure), there is excessive growth of an oxide film as compared with parts comprising ordinary base material at regions other than the straps (see FIG. 4).

Next, the assembled support grid is subjected to recrystallization annealing (Step 105). Consequently, the support grid is held in a heat treatment furnace, and the inside of the heat treatment furnace is either drawn to a vacuum or made into an inert gas atmosphere followed by recrystallization annealing. Recrystallization annealing conditions comprise a heating temperature in the range of 430–750° C., and if particular emphasis is placed on corrosion resistance, a range of 500–750° C., preferably 560–730° C., and particularly preferably 600–720° C., and by making the heating time such that the heating temperature is held for 0.5–24 hours, strain of the rapidly cooled structure of the welded parts can be adjusted and eliminated, and that structure can be transformed into a recrystallized structure. In addition, the corrosion resistance of the welded parts can be improved by adjusting the rapidly cooled structure of the welded parts and cause the precipitation of an intermetallic compound in the prior-β phase of this rapidly cooled structure.

Namely, although the Fe and Cr that form an intermetallic compound in zircaloy alloy hardly ever enter a solid solution in the low-temperature α phase, since they enter into a solid solution at high concentration in the high-temperature β phase during welding, they are present in a supersaturated state in the prior-β phase (quenched α phase) that is rapidly cooled when the structure is transformed into a quenched structure by rapid cooling after welding. The supersaturated state of Fe and Cr is terminated by recrystallization annealing resulting in precipitation in the form of an intermetallic compound.

Furthermore, if the annealing temperature is in the range of 430–500° C. of the above annealing temperature range of 430–750° C., although corrosion resistance of the welded parts is slightly inferior to that in the case of the annealing temperature exceeding 500° C., the mechanical strength of the welded parts is higher, while if the annealing temperature is within the range of greater than 500° C. to 750° C., although the mechanical strength of the welded parts is inferior to that in the range of 430–500° C., the corrosion resistance of the welded parts is superior.

Furthermore, if the annealing temperature of the recrystallization annealing conditions is lower than 430° C., the shortcoming results in which removal of stress becomes inadequate, while if the temperature exceeds 750° C., there is the problem of inviting a decrease in corrosion resistance. In addition, if the annealing temperature is within the range of 560–730° C., recrystallization conditions are such that corrosion resistance does not decrease, and if the temperature is within the range of 600–720° C., even more desirable effects are obtained in which effective precipitate growth is observed. If the holding time of this annealing temperature is shorter than 0.5 hours, it is not possible to adjust the rapidly cooled structure of the welded parts and precipitate an intermetallic compound, while if the holding time exceeds 24 hours, the problem occurs in which there is the risk of decreased corrosion resistance.

In this manner, a support grid can be produced that has superior corrosion resistance (Step 106).

According to this embodiment as described above, the corrosion resistance of welded parts can be improved without impairing the characteristics of a support grid made of a zircaloy alloy plate. As a result, even in the case of carrying out highly efficient operation in a nuclear reactor using, for example, a high burn-up fuel in which the concentration of $U_{238}$ in the uranium fuel pellets has been increased, even more highly reliable operation is possible since the leeway with respect to the allowed range corrosion resistance of the welded parts of the support grid increases.

Next, examples of recrystallization annealing of the support grid in the present invention will be explained.

Examples 1–4 and Comparative Example 1

Zircaloy 4 for the zircaloy alloy was used for the straps, the intersections of the support grid were spot welded. After welding, a cooling rate is set to 100° C./second.

In Example 1, the recrystallization annealing was carried out at a heating temperature of 600° C. for 0.5 hours. In Example 2, the recrystallization annealing was carried out at a heating temperature of 680° C. for 0.5 hours. In Example 3, the recrystallization annealing was carried out at a heating temperature of 680° C. for 2 hours.

In Example 4, the recrystallization annealing was carried out at a heating temperature of 680° C. for 8 hours. In addition, in the Comparative Example 1 as the prior art, the welded parts were left as a welded structure without performing recrystallization annealing after welding.

The relationship between recrystallization temperature conditions and the precipitation status of the intermetallic compound for Examples 1 through 4 and Comparative Example 1 as prior art were as shown in Table 1.

TABLE 1

|  | Annealing conditions | Amount of precipitate | Corrosion resistance |
| --- | --- | --- | --- |
| Comparative Example 1 (Prior art) | Welded structure | None | bad |
| Example 1 | at 600° C. for 0.5 hr | Small | good |
| Example 2 | at 680° C. for 0.5 hr | Small | good |
| Example 3 | at 680° C. for 2 hr | Large | excellent |
| Example 4 | at 680° C. for 8 hr | Large | excellent |

It is clear from the test results shown in Table 1, in Examples 1 through 4, the intermetallic compound was able to be precipitated in the welded structure by annealing for 0.5 hours at a heating temperature of 600–680° C., and as a result of carrying out annealing for a longer time, more intermetallic compound was able to be precipitated. Consequently, it was confirmed that corrosion resistance was able to be improved in all of the Examples 1 through 4, and corrosion resistance was able to be further improved by annealing for longer periods of time in particular.

In contrast, in the comparative example 1 as prior art, intermetallic compound was unable to be precipitated, and the effect of improving corrosion resistance was not demonstrated.

What is claimed is:

1. A production method for a nuclear fuel assembly support grid comprising the steps of:
   assembling a plurality of inner straps and a plurality of outer straps in a grid form;
   welding intersections of the inner straps and intersections of the inner straps and outer straps; and
   carrying out annealing thereafter to precipitate an intermetallic compound on the intersections of the inner straps and intersections of the inner straps and outer straps welded;

wherein said inner and outer straps comprises a zircaloy alloy comprising iron in an amount of 0.18 to 0.24% by weight, chromium in an amount of 0.07 to 0.13% by weight, and oxygen in an amount of 0.09 to 0.16% by weight, and said annealing is carried out sufficiently such that said intermetallic compound represented by $Zr(Fe, Cr)_2$ is recrystallized.

2. A production method for a nuclear fuel assembly support grid according to claim 1, wherein said annealing is carried out at 560–750° C. and held for 0.5–24 hours.

3. A production method for a nuclear fuel assembly support grid according to claim 1, wherein said zircaloy alloy comprises tin in an amount of 1.2 to 1.7% by weight, iron in an amount of 0.18 to 0.24% by weight, chromium in an amount of 0.07 to 0.13% by weight, oxygen in an amount of 0.09 to 0.16% by weight, and balance being zirconium and unavoidable impurities.

4. A production method for a nuclear fuel assembly support grid according to claim 2, wherein said annealing is carried out at 660–700° C.

5. A production method for a nuclear fuel assembly support grid according to claim 1, wherein when a filler metal used for welding is used, the filler metal comprises tin in an amount of 1.2 to 1.7% by weight, iron in an amount of 0.18 to 0.24% by weight, chromium in an amount of 0.07 to 0.13% by weight, oxygen in an amount of 0.09 to 0.16% by weight, and balance being zirconium and unavoidable impurities.

6. A nuclear fuel assembly support grid produced by a production method for a nuclear fuel assembly support grid to claim 1.

* * * * *